United States Patent [19]

Garza

[11] Patent Number: 4,462,559
[45] Date of Patent: Jul. 31, 1984

[54] MEANS FOR CONTROLLING LATERAL MOVEMENT OF A HELICOPTER

[76] Inventor: Roberto M. Garza, P.O. Box 7036, San Antonio, Tex. 78207

[21] Appl. No.: 415,580

[22] Filed: Sep. 7, 1982

[51] Int. Cl.³ .............................................. B64C 27/00
[52] U.S. Cl. .................................... 244/17.19; 244/87
[58] Field of Search ............... 244/17.11, 17.19, 17.13, 244/88, 90 R, 87

[56] References Cited

U.S. PATENT DOCUMENTS

| | | | |
|---|---|---|---|
| 2,265,193 | 12/1941 | Platt | 244/17.19 |
| 2,338,935 | 1/1944 | Hafner | 244/17.19 |
| 2,379,977 | 7/1945 | Martin | 244/90 R |
| 2,386,915 | 10/1945 | Spittler | 244/88 |
| 2,585,468 | 2/1952 | Isacco . | |
| 2,695,674 | 11/1954 | Kaman et al. . | |
| 2,980,364 | 4/1961 | Hohenemser . | |
| 3,034,746 | 5/1962 | De Temple . | |
| 3,045,950 | 7/1962 | Jennings, Jr. . | |
| 3,096,953 | 7/1963 | Koump | 244/17.19 |

FOREIGN PATENT DOCUMENTS 1256015  2/1961  France ............................ 244/17.19

Primary Examiner—Galen L. Barefoot
Attorney, Agent, or Firm—Gunn, Lee & Jackson

[57] ABSTRACT

A new means for controlling yaw or lateral movement of rotary wing aircraft that makes use of the entire tail section or fuselage of the aircraft. The tail section is comprised of a tail aileron, a rudder, and a trimming tab horizontally hinged to the aileron. The aileron is attached to a rotatable support boom which is supported by a plurality of fixed bushings and covered by a shroud. A pair of tail cables are attached to either side of the support boom and a pair of foot pedals within the cabin for controlling the direction and degree of pivot of the aileron. The rudder is vertically hinged to the rear of the aileron, and its pivotal movement is controlled by a pair of rudder cables attached to either side of the rudder and to the pedals within the cabin. Depression of the left or right pedal will cause the aileron and rudder to pivot to the left or right, respectively. The trimming tab is pivoted to the right or left by automatic control means independent of the aileron and rudder control mechanism. During flight, the down draft from the helicopter blade upon the aileron and trimming tab, and the wind from the forward motion of the helicopter upon the rudder, will cause the helicopter to move to the left or right as desired depending upon depression of the corresponding pedal.

16 Claims, 7 Drawing Figures

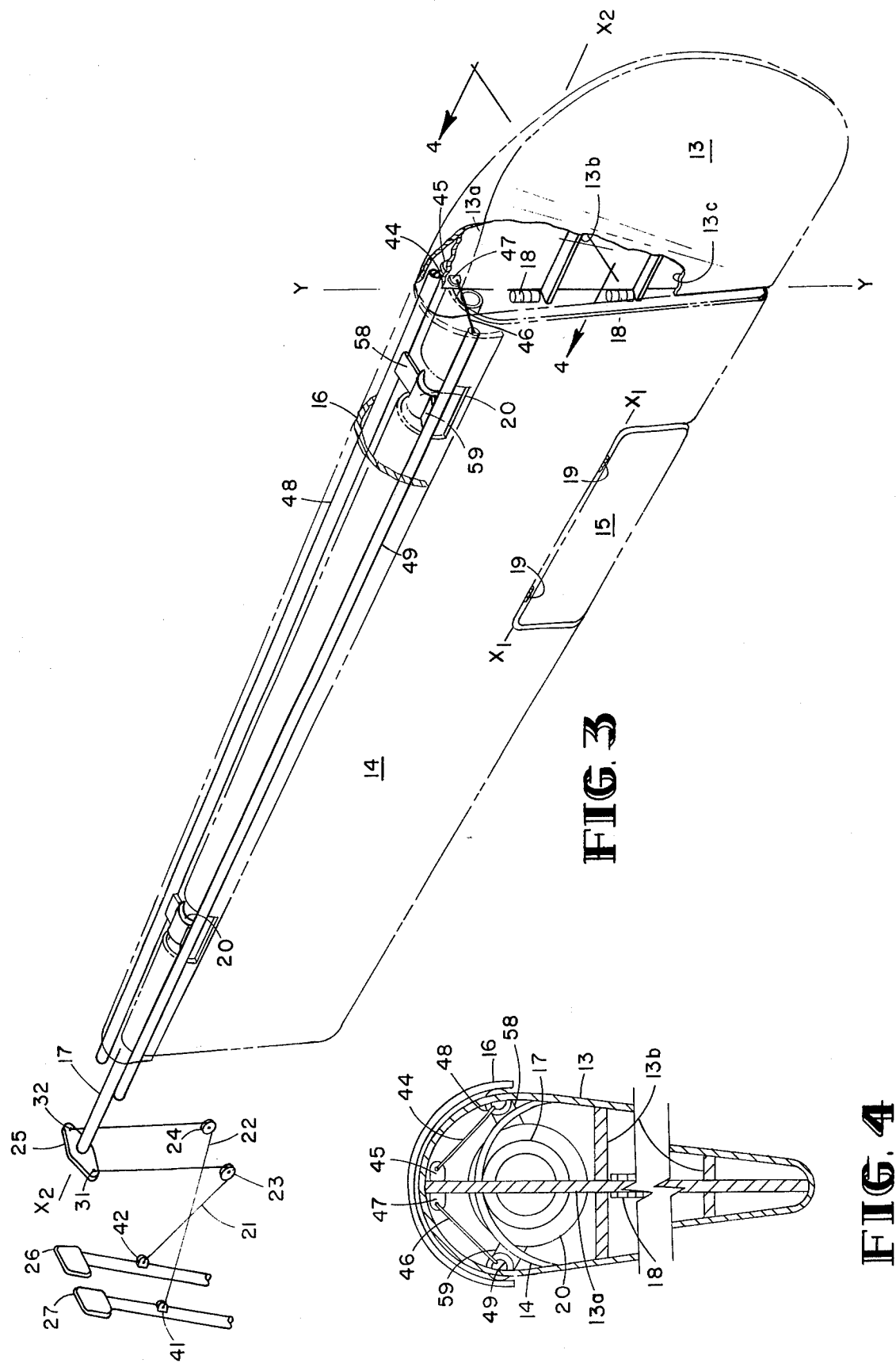

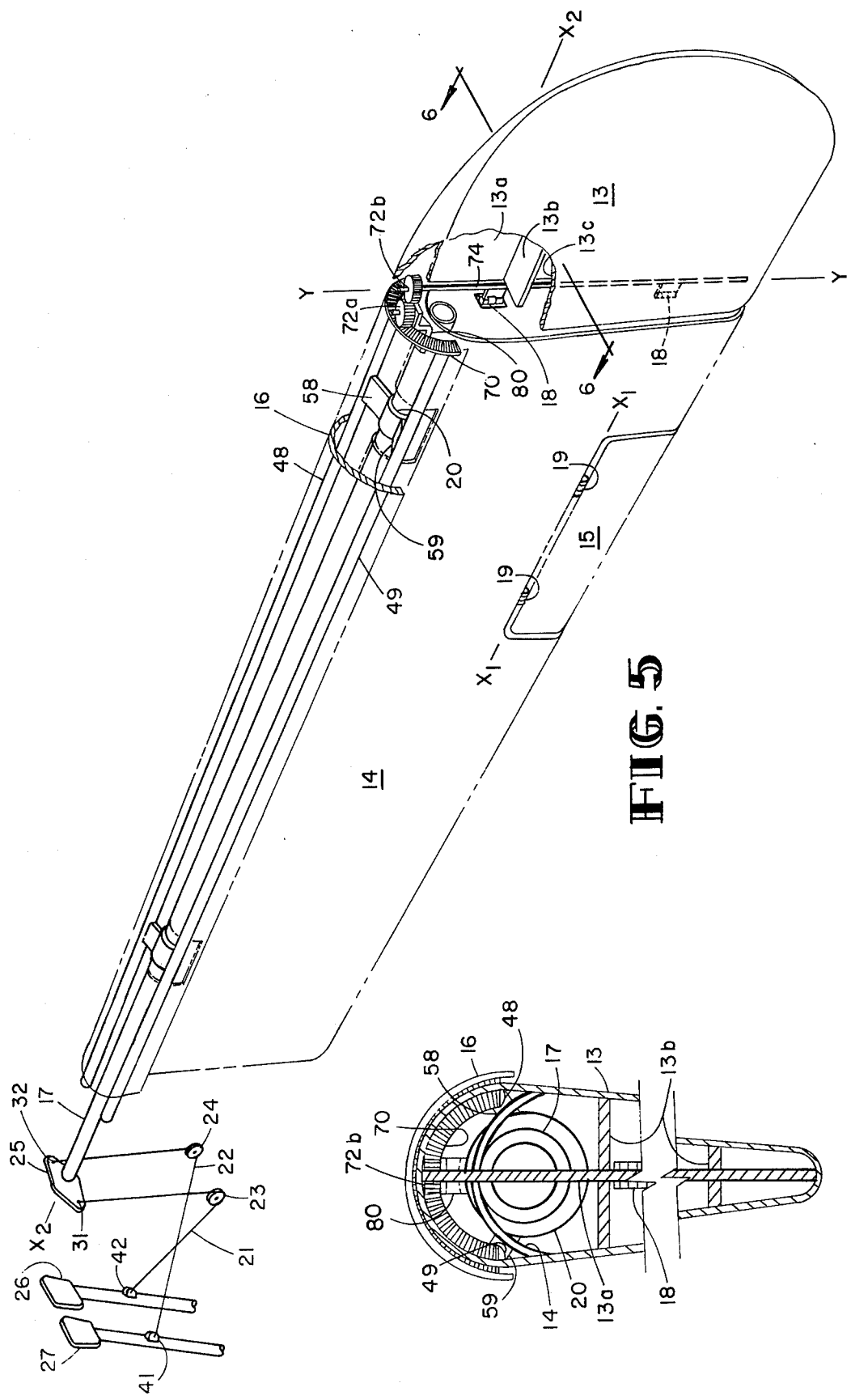

MEANS FOR CONTROLLING LATERAL MOVEMENT OF A HELICOPTER

BACKGROUND OF THE INVENTION

Rotary wing aircraft, otherwise known as helicopters, are typically designed to comprise a cabin, a tail, and a large rotary propeller mounted atop the cabin. Whereas the large propeller is used to achieve lift and forward motion of the aircraft, a smaller sized spinner is often mounted to the rear of the tail for controlling lateral movement or yaw of the aircraft. The importance of this rear spinner for lateral control is most apparent when the spinner breaks or becomes disabled, as is possible during warfare. When such occurs, the pilot will lose control and the helicopter will crash.

Efforts at eliminating the spinner have resulted in the use of a rudder on the rear of the tail section for controlling lateral movement. Typical efforts and designs are seen in the prior art discussed hereinbelow.

The present invention relates to a new helicopter control means that also eliminates the need for a spinner at the rear of the tail section. Unlike prior designs that merely use a rudder, however, this design uses the entire tail section or fuselage for controlling yaw. Specifically, the present invention makes use for a tail aileron and a trimming tab hinged to said aileron in addition to a rudder at the rear of the tail section. The result is a more efficiently designed helicopter with greater stability and lateral control than can be achieved by use of a rudder alone.

BRIEF DESCRIPTION OF THE PRIOR ART

The elimination of the rear spinner and lateral control of a helicopter by use of a rudder is not new in the art. U.S. Pat. No. 2,585,468 issued to Isacco discloses a vertical rudder adapted to turn on a horizontal axis and on a vertical axis. Vertical and horizontal rotation of the rudder occurs simultaneously and is controlled from inside the helicopter cabin via cables. However, the rudder is mounted at the rear of the fuselage and no pivoting of the fuselage is disclosed.

Another design that eliminates the need for a tail spinner is the free floating tail surface disclosed in U.S. Pat. No. 2,980,364 issued to Hohenemser. This surface moves freely about a hinge axis and includes a pair of tabs at the trailing edge of the tail surface.

Still another helicopter design that eliminates the need for a tail spinner is shown in U.S. Pat. No. 3,045,950 issued to Jennings. This design makes use of a planar rudder pivotally mounted on a rudder shaft at the rearmost end of the tail. Pivoting of the rudder about the axis of the shaft is achieved by means of cables attached to the shaft and a pair of pedals within the cabin.

U.S. Pat. No. 3,034,746 issued to De Temple discloses a pair of fins pivotally mounted on a frame by angular stub shafts and secured together by a cross bar for simultaneous movement. The helicopter design of Kaman and Stevens in U.S. Pat. No. 2,695,674 discloses a rudder at the rear of the fuselage that pivots about a substantially vertical axis. Pivoting is achieved by cables connected at one end to the rudder and at the other end to foot pedals.

Although all of the above discussed patents are directed to helicopter designs that eliminate a tail spinner for controlling helicopter yaw, the invention helicopter design differs substantially from those of the prior art. For helicopters having counter-rotating propellers, there is very little torque exerted to spin the helicopter; however, the complexity of counter-rotating propellers greatly increases the cost and the probability of failure, especially in combat. The invention design makes use of the entire fuselage and includes not only a rear rudder but also a tail aileron and trimming tab for controlling lateral movement of the helicopter. As such, the invention is more efficiently designed and achieves a greater degree of lateral control than the designs disclosed by the prior art.

SUMMARY OF THE INVENTION

It is an object of the present invention to provide a new and useful means for controlling lateral movement of a helicopter.

Another object of the invention is to provide a more efficiently designed helicopter with greater stability and lateral control than has previously been achieved.

Still another object of the present invention is to provide a helicopter control means which may be constructed and maintained economically.

A further object of the present invention is to provide an energy efficient helicopter control means. A typical helicopter utilizing a tail spinner for controlling yaw expends approximately one-third of its engine power for operating the spinner. The use of rudder, tail aileron and trimming tab, therefore, reduces the energy requirements of the helicopter.

A still further object of the invention is to use the entire fuselage of the helicopter for controlling lateral movement and eliminate the need for a tail spinner. The tail section or fuselage comprises a tail aileron that is attached to a rotatable support boom extending rearward from the helicopter cabin. The support boom is supported within a plurality of fixed bushings and covered by a shroud. A rudder is hinged to the rear of the aileron and pivots about a vertical axis. A trimming tab is horizontally hinged at the lower edge of the aileron and pivoted by means of an automatic or manual control mechanism.

Pivoting of the support boom and aileron is achieved by cables attached on either side of the cabin end of the support boom and pedals located within the cabin. Rudder pivoting can be achieved in various ways. In the preferred embodiment, a pair of rudder cables are attached to the pedals located within the cabin and on either side of the rudder centerboard.

Effective lateral control during flight is achieved by controlled pivoting of the aileron, rudder, and trimming tab and the effect of the down draft from the helicopter blade on the aileron and trimming tab, and the effect of the draft created by the forward motion of the helicopter on the rudder. An appropriate booster device enables the pilot to pivot the aileron and rudder with relative ease. A memory mechanism is further included to enable the pilot to remove his foot from a pedal yet retain the desired degree of aileron and rudder pivot. A memory mechanism may also be provided for the trimming tab.

Further objects will be apparent as the helicopter control means is described in greater detail hereinbelow.

BRIEF DESCRIPTION OF THE DRAWINGS

FIG. 3 is a perspective view of the tail portion of the helicopter control means showing the aileron pivoting mechanism and an alternative means for controlling rudder pivoting.

FIG. 4 is a rear view, in section, taken on section lines 4—4 of FIG. 3 showing the alternate rudder pivoting mechanism of FIG. 3.

FIG. 5 is a perspective view of the tail portion of the helicopter control means showing the aileron pivoting mechanism and an alternate means for controlling rudder pivoting.

FIG. 6 is a rear view, in section, taken on section lines 6—6 of FIG. 5 showing the alternate rudder pivoting mechanism of FIG. 5.

DESCRIPTION OF THE PREFERRED EMBODIMENT

Figures 1, 2:
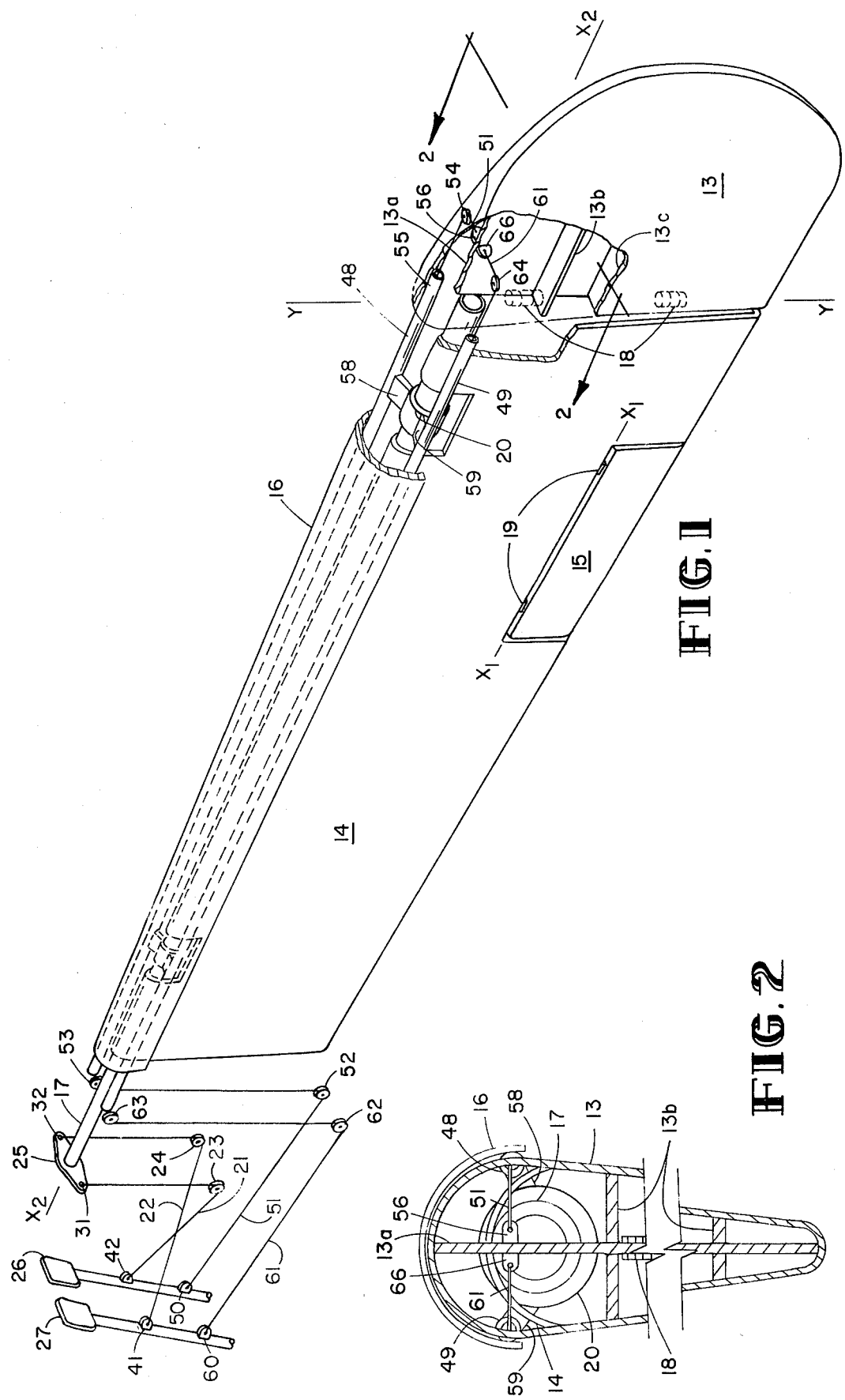
FIG. 1 is a fragmented perspective view of the tail portion of the helicopter control means showing an aileron pivoting mechanism and a means for controlling rudder pivoting.
FIG. 2 is a rear view, in section, taken on section lines 2—2 of FIG. 1 showing the rudder pivoting mechanism of FIG. 1.
Figure 1A:
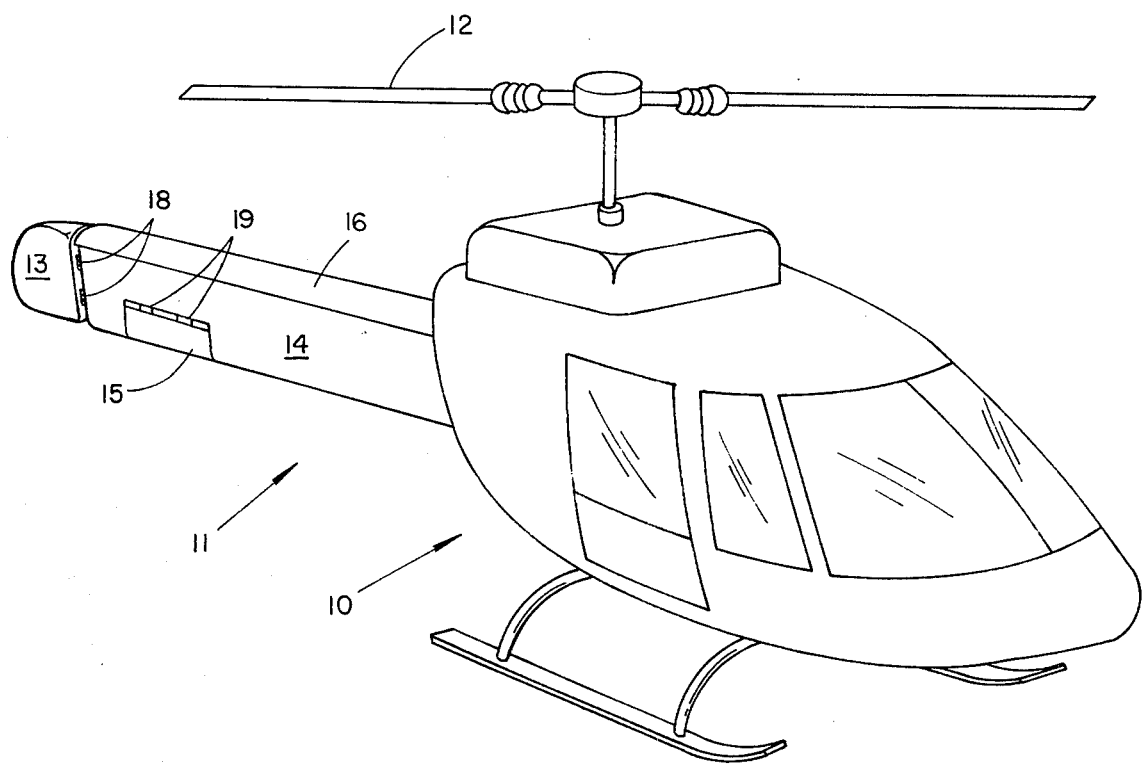
FIG. 1a is a perspective view of a helicopter incorporating a new means for controlling lateral movement.

In FIG. 1a, the invention helicopter control means is shown comprising a cabin portion 10 and tail portion 11 with a helicopter blade 12 appropriately mounted atop the cabin 10. The tail portion 11 includes a rudder 13 vertically hinged at 18 to a tail aileron 14. The tail aileron 14 also includes as a part thereof a trimming tab 15 horizontally hinged at 19. A fixed shroud 16 covers the uppermost portion of aileron 14 and is secured to cabin 10.

A more detailed view of tail portion 11 and corresponding aileron control mechanism is shown in FIG. 1. The aileron 14 is partially covered by fixed shroud 16 (partially cut away) and supported by a boom 17 that extends rearward from the cabin 10 (not shown). The rudder 13 is covered by shroud 13c (partially cut away) and hingedly connected to aileron 14 at 18 for pivoting about a vertical axis Y—Y. The rudder 13 comprises a rudder centerboard 13a and a plurality of rudder ribs 13b on either side of centerboard 13a. Trimming tab 15 is hingedly connected to aileron 14 at 19 for pivoting about a horizontal axis $X_1$—$X_1$.

The tail aileron 14 is connected to rotatable support boom 17 and is partially cut away so as to allow boom 17 to be supported by fixed bushings 20 and permit pivotal movement about a horizontal axis $X_2$—$X_2$. Bushing arms 58 and 59 extend from bushings 20 and attach to rods 48 and 49, respectively, which are secured to shroud 16. It is to be understood that, whereas, support boom 17 pivots within one or more lubricated bushings 20, shroud 16, rods 48, 49, and bushings 20 remain stationary at all times. Furthermore, although bushing arms 58 and 59 are shown connected to rods 48 and 49, respectively, it is also contemplated that they may be connected directly to shroud 16.

Right tail aileron cable 21 and left tail aileron cable 22 are attached to cross-member 25 at 31 and 32, respectively. Right tail aileron cable 21 passes through aileron pulley 23 and is attached to pedal 26 at 42. Left tail aileron cable 22 passes through aileron pulley 24 and is attached to pedal 27 at 41. Left pedal 27 and right pedal 26 are located inside of cabin portion 10 (not shown) for easy control by the helicopter operator.

Right rudder cable 51 is attached to right pedal 26 at 50 and passes through right rudder cable pulleys 52, 53, and 54. Left rudder cable 61 is attached to left pedal 27 at 60 and passes through left rudder cable pulleys 62, 63, and 64. It is to be understood that aileron pulleys 23, 24 and rudder pulleys 52, 53 and 62, 63 are appropriately connected to cabin portion 10 (not shown). Likewise, rudder cable pulleys 54 and 64 are properly attached to the ends of rods 48 and 49, respectively, located within shroud 16.

As more clearly illustrated in FIG. 2, right rudder cable 51 and left rudder cable 61 are attached on either side of rudder centerboard 13a at 56 and 66, respectively. A plurality of rudder ribs 13b extend from either side of rudder centerboard 13a and provide a skeleton for rudder shroud 13c. Rudder cables 51 and 61 are shown passing through rods 48 and 49, respectively, but it is also contemplated that they may be passed through the internal bore of support boom 17.

Lateral control during flight is achieved by the appropriate depression of foot actuated pedals 26 and 27 by the helicopter operator. When the left pedal 27 is pushed by the helicopter pilot, it will pull left rudder cable 61 and tail aileron cable 22. The pulling of left rudder cable 61 (which extends all the way back to rudder centerboard 13a) will cause hingedly connected rudder 13 to pivot to the left about axis Y—Y. Also, because tail aileron 14 is connected to support boom 17 and boom 17 is pivotally secured within bushings 20, tail aileron 14 will pivot to the left about axis $X_2$—$X_2$ when left pedal 27 is pushed.

The trimming tab 15 is pivoted to the right or left by automatic or manual control means independent of the aileron and rudder control mechanism. The trimming tab 15 and corresponding control mechanism permits finer control of the helicopter. Typical of such mechanisms are those used in airplanes for controlling movement of the tabs on aircraft wings. Since such mechanisms are commonly known and readily apparent to those skilled in the art, it is not believed necessary to describe them in detail.

When the left pedal 27 is pushed and tail aileron 14 is pivoted to the left, the down draft from helicopter blade 12 on the aileron 14 will cause the helicopter to go to the left. Likewise, the forward motion of the helicopter, which creates wind that strikes rudder 13, will also cause the helicopter to go to the left. If the right pedal 26 is pushed, just the opposite occurs. The pulling of rudder cable 51 and tail aileron cable 21 will pivot the rudder 13 and aileron 14 to the right and cause the helicopter to go to the right. Likewise, the helicopter will move to the right due to the automatic or manual pivot of the trimming tab 15 to the right and the down draft from helicopter blade 12 against trimming tab 15.

It is to be understood that regardless of the rudder control mechanism employed, the helicopter will be equipped with an appropriate booster device (not shown), such as a hydraulic booster, to enable the pilot to pivot the aileron 14 and rudder 13 with relative ease. A memory mechanism (not shown) should also be provided to enable the pilot to remove his foot from a pedal and yet retain the appropriate degree of pivot of the aileron 14 and rudder 13. A memory mechanism may also be provided for the trimming tab 15.

An alternate embodiment for controlling the pivot of rudder 13 is shown in FIG. 3 and FIG. 4. Struts 44 and 46 are connected on either side of rudder centerboard 13a at 45 and 47, respectively. The opposite ends of struts 44 and 46 are attached to rods 48 and 49, respectively, located within and connected to shroud 16.

Bushing arms 58 and 59 of one or more bushings 20 are likewise attached to stationary rods 48 and 49, respectively. In this embodiment, depression of foot pedal 26 or 27 will pull aileron cable 21 or 22, respectively, and pivot support boom 17 and aileron 14. A pivot to the right by aileron 14 will cause hingedly connected rudder 13 to pivot to the right about axis Y—Y. This results from the simultaneous movement of strut connection 47 toward rod 49 and the pull on rudder 13 by strut 44.

Still another embodiment for controlling the pivot of rudder 13 is shown in FIG. 5 and FIG. 6. A semi-circular ring gear 70 is connected to rods 48 and 49, which in turn are connected to shroud 16 and bushing arms 58 and 59, respectively. A pinion rod 74 having a pinion gear 72b fixedly mounted thereto is connected to rudder centerboard 13a by any suitable means. The rudder pivoting mechanism is further provided with a fixed pinion plate 80 having a pinion gear 72a mounted thereon. Pinion gear 72a is engaged with ring gear 70 and pinion gear 72b in a gear ratio which may be varied as needed or desired. Movement of tail aileron 14 and hingedly connected rudder 13 will also turn pinion gears 72a and 72b. As a result, rudder 13 will pivot about axis Y—Y in the same direction as aileron 14.

While the invention helicopter design has been described in connection with the preferred embodiment, it is not intended to limit the invention to the particular forms set forth, but on the contrary, it is intended to cover such alternatives, modifications, and equivalents as may be included within the spirit and scope of the invention as defined by the appended claims.

I claim:

1. A new means for controlling the lateral movement of a helicopter by an operator comprising:
   a. a cabin;
   b. a tail section extending from said cabin including a shroud, a tail aileron below said shroud and a rudder vertically hinged to one end of said tail aileron;
   c. a rotatable support boom below said shroud extending rearward from said cabin and supported within one or more bushings, wherein said bushings are connected to said shroud and said support boom is connected to said tail aileron for pivoting said tail aileron;
   d. a pair of pedals located within said cabin;
   e. a pair of aileron cables each of which is attached at a first end to one of said pedals and at a second end to either side of said support boom for directly pivoting said tail aileron; and
   f. means for pivoting said rudder simultaneously with the pivoting of said tail aileron.

2. A new means for controlling the lateral movement of a helicopter, as recited in claim 1, wherein said rudder pivoting means comprises a pair of rudder cables below said shroud each of which is attached at a first end to one of said pedals and at a second end to either side of said rudder.

3. A new means for controlling the lateral movement of a helicopter, as recited in claim 1, wherein said rudder pivoting means comprises:
   a. a first and second strut connected to opposite sides of said rudder; and
   b. a first and second rod connected to said shroud, said first rod connected on one end thereof to said first strut and said second rod connected on one end thereof to said second strut for pivoting said rudder simultaneously with the pivoting of said tail aileron.

4. A new means for controlling the lateral movement of a helicopter, as recited in claim 1, wherein said rudder pivoting means comprises:
   a. a first and second rod connected to said shroud, each of which is connected on one end thereof to a semi-circular ring gear; and
   b. a first pinion gear mounted on a pinion plate, said first pinion gear simultaneously engaged with said ring gear and a second pinion gear fixedly mounted to a pinion rod, said pinion rod connected to said rudder for pivoting said rudder simultaneously with the pivoting of said tail aileron.

5. A new means for controlling the lateral movement of a helicopter, as recited in claim 2, 3 or 4, further comprising a trimming tab horizontally hinged to said tail aileron, said trimming tab controlled by a mechanism from within said cabin.

6. A new means for controlling the lateral movement of a helicopter, as recited in claim 2, 3, or 4, wherein said rudder comprises a rudder centerboard with a plurality of rudder ribs attached thereto and extending outward therefrom on either side of said rudder centerboard and a rudder shroud covering said rudder centerboard and said rudder ribs.

7. A new means for controlling the lateral movement of a helicopter, as recited in claim 1, wherein said shroud further comprises a first and second rod connected thereto and wherein said bushings are connected to said shroud by a pair of bushing arms extending outward from said bushings and connected to said first and second rods.

8. A new means for controlling the lateral movement of a helicopter, as recited in claim 2, wherein said rudder cables pass through a first and second rod connected to said shroud.

9. A new means for controlling the lateral movement of a helicopter, as recited in claim 2, wherein said rudder cables pass through the internal bore of said support boom.

10. A new means for controlling the lateral movement of a helicopter, as recited in claim 3 or 4, wherein said bushings are connected to said shroud by a pair of bushing arms extending outward from said bushings and connected to said first and second rods.

11. A new means for controlling the lateral movement of a helicopter by an operator comprising:
    a. a cabin;
    b. a tail section extending rearwardly from said cabin including a shroud and a tail aileron hinged below said shroud;
    c. a rotatable support boom extending rearwardly from said cabin under said shroud, said rotatable support boom being supported by one or more bushings, said bushings being connected to said shroud by one or more bushing arms, said rotatable support boom being connected to said tail aileron for pivoting said tail aileron;
    d. a pair of pedals located within said cabin;
    e. a pair of aileron cables each of which is attached at a first end to one of said pedals and at a second end to either side of said support boom for pivoting said support boom and consequently said tail aileron to either the right or the left; and
    f. a trimming tab connected near a lowermost portion of said tail aileron for automatically trimming said helicopter during normal straight-line flight.

12. A new means for controlling the lateral movement of a helicopter by an operator comprising:

a. cabin;
b. a tail section extending from said cabin including a shroud, a tail aileron and a rudder vertically hinged to one end of said tail aileron;
c. a rotatable support boom extending rearward from said cabin and supported within one or more bushings, wherein said bushings are connected to said shroud and said support boom is connected to said tail aileron for pivoting said tail aileron;
d. a pair of pedals located within said cabin;
e. a pair of aileron cables each of which is attached at a first end to one of said pedals and at a second end to either side of said support boom for pivoting said support boom and said tail aileron;
f. a first and second rod connected to said shroud, each of which is connected on one end thereof to a semi-circular ring gear; and
g. a first pinion gear mounted on a pinion plate, said first pinion gear simultaneously engaged with said ring gear and a second pinion gear fixedly mounted to a pinion rod, said pinion rod connected to said rudder for pivoting said rudder simultaneously with the pivoting of said tail aileron.

13. A new means for controlling the lateral movement of a helicopter by an operator comprising:
a. a cabin;
b. a tail section extending from said cabin including a shroud, a tail aileron and a rudder vertically hinged to one end of said tail aileron;
c. a rotatable support boom extending rearward from said cabin and supported within one or more bushings, wherein said bushings are connected to said shroud and said support boom is connected to said tail aileron for pivoting said tail aileron;
d. a pair of pedals located within said cabin;
e. a pair of aileron cables each of which is attached at a first end to one of said pedals and at a second end to either side of said support boom for pivoting said support boom and said tail aileron;
f. a first and second rod connected to said shroud, each of which is connected on one end thereof to a semi-circular ring gear;
g. a first pinion gear mounted on a pinion plate, said first pinion gear simultaneously engaged with said ring gear and a second pinion gear fixedly mounted to a pinion rod, said pinion rod connected to said rudder for pivoting said rudder simultaneously with the pivoting of said tail aileron; and
h. a trimming tab horizontally hinged to said tail aileron, said trimming tab controlled by a mechanism from within said cabin.

14. A new means for controlling the lateral movement of a helicopter by an operator comprising;
a. a cabin;
b. a tail section extending from said cabin including a shroud, a tail aileron and a rudder vertically hinged to one end of said tail aileron, said rudder comprising a rudder centerboard with a plurality of rudder ribs attached thereto and extending outward therefrom on either side of said rudder centerboard and a rudder shroud covering said rudder centerboard and said rudder ribs;
c. a rotatable support boom extending rearward from said cabin and supported within one or more bushings, wherein said bushings are connected to said shroud and said support boom is connected to said tail aileron for pivoting said tail aileron;
d. a pair of pedals located within said cabin;
e. a pair of aileron cables each of which is attached at a first end to one of said pedals and at a second end to either side of said support boom for pivoting said support boom and said tail aileron;
f. a first and second rod connected to said shroud, each of which is connected on one end thereof to a semi-circular ring gear; and
g. a first pinion gear mounted on a pinion plate, said first pinion gear simultaneously engaged with said ring gear and a second pinion gear fixedly mounted to a pinion rod, said pinion rod connected to said rudder for pivoting said rudder simultaneously with the pivoting of said tail aileron.

15. A new means for controlling the lateral movement of a helicopter by an operator comprising:
a. a cabin;
b. a tail section extending from said cabin including a shroud, a tail aileron and a rudder vertically hinged to one end of said tail aileron;
c. a rotatable support boom extending rearward from said cabin and supported within one or more bushings, wherein said bushings are connected to said shroud and said support boom is connected to said tail aileron for pivoting said tail aileron;
d. a pair of pedals located within said cabin;
e. a pair of aileron cables each of which is attached at a first end to one of said pedals and at a second end to either side of said support boom for pivoting said support boom and said tail aileron; and
f. a pair of rudder cables, each of which is attached at a first end to one of said pedals and at a second end to either side of said rudder and each of which pass through the internal bore of said support boom, for pivoting said rudder simultaneously with the pivoting of said tail aileron.

16. A new means for controlling the lateral movement of a helicopter by an operator comprising:
a. a cabin;
b. a tail section extending from said cabin including a shroud, a tail aileron and a rudder vertically hinged to one end of said tail aileron;
c. a rotatable support boom extending rearward from said cabin and supported within one or more bushings, wherein said bushings are connected to said shroud and said support boom is connected to said tail aileron for pivoting said tail aileron;
d. a pair of pedals located within said cabin;
e. a pair of aileron cables each of which is attached at a first end to one of said pedals and at a second end to either side of said support boom for pivoting said support boom and said tail aileron;
f. a first and second rod connected to said shroud, each of which is connected on one end thereof to a semi-circular ring gear, said bushings connected to said shroud by a pair of bushing arms extending outward from said bushings and connected to said first and second rods; and
g. a first pinion gear mounted on a pinion plate, said first pinion gear simultaneously engaged with said ring gear and a second pinion gear fixedly mounted to a pinion rod, said pinion rod connected to said rudder for pivoting said rudder simultaneously with the pivoting of said tail aileron.

* * * * *